United States Patent
Xu et al.

(10) Patent No.: US 12,156,208 B2
(45) Date of Patent: Nov. 26, 2024

(54) CHANNEL TRANSMISSION METHOD, APPARATUS, NETWORK SIDE DEVICE, AND TERMINAL

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xiaodong Xu, Beijing (CN); Tuo Yang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 403 days.

(21) Appl. No.: 17/628,239

(22) PCT Filed: Jul. 27, 2020

(86) PCT No.: PCT/CN2020/104875
§ 371 (c)(1),
(2) Date: Jan. 19, 2022

(87) PCT Pub. No.: WO2021/018089
PCT Pub. Date: Feb. 4, 2021

(65) Prior Publication Data
US 2022/0264613 A1  Aug. 18, 2022

(30) Foreign Application Priority Data
Jul. 30, 2019  (CN) .......................... 201910693478.X (51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0061* (2013.01); *H04W 72/0466* (2013.01); *H04W 72/23* (2023.01)

(58) Field of Classification Search
CPC ... H04L 1/0061; H04L 1/0072; H04L 1/1812; H04L 1/1861; H04L 5/0044;
(Continued)

(56) References Cited

U.S. PATENT DOCUMENTS 9,277,533 B2 * 3/2016 Rapaport .............. H04W 72/23
9,467,819 B2 * 10/2016 Niu ........................ H04L 5/0055
(Continued)

FOREIGN PATENT DOCUMENTS

CN  101120610 A  2/2008
CN  107733626 A  2/2018
(Continued)

OTHER PUBLICATIONS

"Discussion on UE Feedback for DL Multicast/Broadcast", May 2016, 3GPP TSG RAN WG1 Meeting #65, R1-164537, Source: LG Electronics; Feedback for DL Broadcast, 3rd Generation Partnership Project, Mobile Competence Centre, Nanjing, China, 5 pgs.
(Continued)

*Primary Examiner* — Eric Nowlin
(74) *Attorney, Agent, or Firm* — Cooper Legal Group, LLC (57) ABSTRACT

Provided in the present disclosure are a channel transmission method, an apparatus, a network-side device and a terminal, the method comprising: sending PDCCH to a first terminal, a CRC of DCI of the PDCCH being scrambled by a first
(Continued)

Transmit PDCCH to a first terminal, CRC of DCI of the PDCCH being scrambled by a first RNTI of the first terminal, and a scrambling sequence generator of PDSCH scheduled by the PDCCH being initialized with a second RNTI or a third parameter — 11

RNTI of the first terminal, and a scrambling sequence generator of PDSCH scheduled by the PDCCH being initialized with a second RNTI or a third parameter; the second RNTI or the third parameter being different from the first RNTI, and the second RNTI or the third parameter being a common parameter between the first terminal and at least one other terminal.

20 Claims, 2 Drawing Sheets

(51) Int. Cl.
*H04W 72/044* (2023.01)
*H04W 72/23* (2023.01)

(58) Field of Classification Search
CPC ... H04L 5/0051; H04L 5/0053; H04L 5/0055; H04W 72/0466; H04W 72/1273; H04W 72/20; H04W 72/23
See application file for complete search history.

(56) References Cited

U.S. PATENT DOCUMENTS

| | | | | |
|---|---|---|---|---|
| 9,769,819 | B2* | 9/2017 | Rapaport | H04W 72/30 |
| 9,877,341 | B2* | 1/2018 | Lin | H04L 5/0055 |
| 10,568,083 | B2* | 2/2020 | Takano | H04W 72/121 |
| 10,582,534 | B2 | 3/2020 | Park | |
| 10,841,911 | B2* | 11/2020 | Park | H04L 5/0053 |
| 11,239,975 | B2* | 2/2022 | Liu | H04W 72/0446 |
| 11,349,593 | B2* | 5/2022 | Park | H04L 1/00 |
| 2013/0163532 | A1* | 6/2013 | Anderson | H04L 5/0053 370/329 |
| 2013/0315124 | A1* | 11/2013 | Rapaport | H04W 72/23 370/312 |
| 2014/0226552 | A1* | 8/2014 | Niu | H04W 4/06 370/312 |
| 2014/0355493 | A1* | 12/2014 | Niu | H04L 12/189 370/312 |
| 2016/0183226 | A1* | 6/2016 | Rapaport | H04W 72/23 370/312 |
| 2017/0347341 | A1* | 11/2017 | Zhang | H04L 12/189 |
| 2017/0374654 | A1* | 12/2017 | Rapaport | H04L 1/1819 |
| 2018/0027533 | A1* | 1/2018 | Takano | H04W 72/23 370/329 |
| 2018/0049169 | A1* | 2/2018 | Lin | H04W 72/23 |
| 2018/0049246 | A1* | 2/2018 | Park | H04W 74/0833 |
| 2018/0152926 | A9* | 5/2018 | Takano | H04L 5/0053 |
| 2019/0007891 | A1* | 1/2019 | Xu | H04W 4/06 |
| 2019/0150155 | A1* | 5/2019 | Chatterjee | H04W 72/23 370/335 |
| 2019/0182012 | A1* | 6/2019 | Liu | H04W 72/04 |
| 2019/0215123 | A1* | 7/2019 | Zhou | H04W 72/30 |
| 2019/0320457 | A1* | 10/2019 | Maaref | H04W 48/12 |
| 2019/0387501 | A1* | 12/2019 | Park | H04L 5/005 |
| 2020/0022144 | A1* | 1/2020 | Papasakellariou | H04W 72/23 |
| 2020/0145129 | A1* | 5/2020 | Nammi | H04W 4/027 |
| 2021/0013991 | A1* | 1/2021 | Park | H04W 8/24 |

FOREIGN PATENT DOCUMENTS

| | | | | |
|---|---|---|---|---|
| CN | 107734693 | A | 2/2018 | |
| CN | 109075926 | A | 12/2018 | |
| WO | 2017057989 | A1 | 4/2017 | |
| WO | WO-2020013559 | A1 * | 1/2020 | ........... H04L 5/0044 |
| WO | WO-2020255415 | A1 * | 12/2020 | |

OTHER PUBLICATIONS

"Procedures Related Consideration to NOMA", Nov. 2018, Source: Samsung, 3GPP TSG RAN WG1 Meeting #95, R1-1812968, 3rd Generation Partnership Project, Mobile Competence Centre, Spokane, USA; 5 pgs.
First Office Action of the European application No. 20848264.6, issued on Mar. 24, 2023, 6 pgs.
"Remaining Issues on PDCCH Structure", Jan. 2018, Source: VIVO, 3GPP TSG RAN WG1, Meeting AH1801, R1-1800195 , Vancouver, Canada, Retrieved from the Internet:URL: http://www.3gpp.org/ftp/tsg%5Fran/WG1%5FRL1/TSGR1%5FAH/NR%5FAH%5F1801/Docs/, 3 pgs.
Supplementary European Search Report in the European application No. 20848264.6, mailed on Jul. 29, 2022, 9 pgs.
International Search Report in the international application No. PCT/CN2020/104875, mailed on Oct. 27, 2020, 2 pgs.
English translation of the Written Opinion of the International Search Authority in the international application No. PCT/CN2020/104875, mailed on Oct. 28, 2020, 4 pgs.
"On 2-step RACH Procedure", May 2019, 3GPP TSG RAN WG1 #97, R1-1906747, Reno, USA, Source: Nokia, Nokia Shanghai Bell, 23 pgs.
"Physical Channels and Modulation", (Release 14) Dec. 2016, 3GPP TS 36.211, V14.1.0, 3rd Generation Partnership Project; Technical Specification Group Radio Access Network; Evolved Universal Terrestrial Radio Access (E-UTRA), 176 pgs.

* cited by examiner

Transmit PDCCH to a first terminal, CRC of DCI of the PDCCH being scrambled by a first RNTI of the first terminal, and a scrambling sequence generator of PDSCH scheduled by the PDCCH being initialized with a second RNTI or a third parameter — 11

FIG. 1

Receive PDCCH, the CRC of the DCI of the PDCCH being scrambled by the first RNTI of the first terminal, and a scrambling sequence generator of the PDSCH scheduled by the PDCCH being initialized with the second RNTI or the third parameter — 21

FIG. 2

Transmitting module — 31

FIG. 6

CHANNEL TRANSMISSION METHOD, APPARATUS, NETWORK SIDE DEVICE, AND TERMINAL

CROSS-REFERENCE TO RELATED APPLICATION

The application claims priority to Chinese Patent Application No. 201910693478.X, filed on Jul. 30, 2019, the disclosure of which is hereby incorporated by reference in its entirety.

TECHNICAL FIELD

The present disclosure relates to the technical field of communications, and in particular to a channel transmission method and apparatus, a network side device, and a terminal.

BACKGROUND

In the 4th Generation (4G) Long Term Evolution (LTE), multicast/broadcast transmission is realized by introducing Multimedia Broadcast Multicast Service (MBMS) and Single Cell Point to Multipoint (SC-PTM) technologies. However, the MBMS and SC-PTM technologies in the related art are rarely introduced in real commercial networks, mainly because of the complexity and mode of their network structure, and services are provided still based on the mode of preset service in the related art. For example, for an MBMS service, logical channels transmitted at an air interface mainly include a Multicast Control Channel (MCCH) and a Multicast Traffic Channel (MTCH). The MCCH is used for transmitting control information of the MBMS, and the MTCH is used for transmitting downlink data. Both the logical channels MCCH and MTCH may be mapped to a Multicast Channel (MCH), and finally the MCH is transmitted by Physical Multicast Channel (PMCH).

For an SC-PTM service, the logical channels transmitted at the air interface mainly include a Single-Cell Multicast Control Channel (SC-MCCH) and a Single-Cell Multicast Traffic Channel (SC-MTCH). The SC-MCCH is used for transmitting control information of the SC-MTCH, and the SC-MTCH is used for transmitting service data of the SC-PTM. Both the logical channels SC-MCCH and SC-MTCH may be mapped to a Downlink-Shared Channel, DL-SCH (DL-SCH), and finally the DL-SCH is transmitted by Physical Downlink Shared Channel (PDSCH).

Regarding the transmission of the PMCH and the PDSCH:

the initialization value of a scrambling sequence generator of the PMCH is a function of a Multicast Broadcast Single Frequency Network (MBSFN) ID, and the initialization value of a scrambling sequence generator of the PDSCH is a function of a Radio Network Temporary Identifier (RNTI). The RNTI here depends on the types of RNTI used by a scheduled Physical Downlink Control Channel (PDCCH), such as a Cell RNTI (C-RNTI) of a unicast PDCCH and a System Information RNTI (SI-RNTI) of the PDCCH scheduled based on the system information.

It should be pointed out that, under a SC-PTM mechanism in the related art, all terminals interested in a certain MBMS service in the current cell detect the PDCCH scrambled by the same Group RNTI (G-RNTI), assuming that the initialization value of the scrambling sequence generator of the PDSCH is a function of the same G-RNTI.

In LTE broadcast or multicast technologies of the related art, both the original MBMS based on multi-cell SFN and the later SC-PTM based on single-cell MBMS need to be based on preset broadcast information, that is, it is needed to configure information, such as a cycle of the MCCH/SC-MCCH, in the broadcast information in advance, even for single cell broadcast like the SC-PTM, and the information is available to all terminals in the cell. This mode requires a network to configure specific system information in advance, which limits the freedom of selection of the terminal. In the related art, the mode of providing live broadcast services generally based on different Applications (APP) is difficult to be accepted by users, or even if the network configures the mode, users may not be willing to choose to watch programs in this mode.

Considering the SC-PTM mechanism in the related art and users' habits, if a network side may form, based on statistical information, terminals that use the same APP to watch the same live program in the current cell into a multicast group, and then provide multicast services to these users, instead of a service mode in which an independent resource is used for unicast for each user, the consumption of radio resources may be effectively reduced at least in a live scene. However, this combined mode will change the simple broadcast mode of SC-PTM, the LTE SC-PTM mode in the related art does not support Hybrid Automatic Repeat reQuest (HARQ), the terminal does not need to feed back channel state information or HARQ-Acknowledge/Negative Acknowledgement (ACK/NACK) information, and the network side cannot confirm that each interested user has received a service accurately.

The solution in the related art is to introduce directly an HARQ mechanism, and even a channel feedback mechanism under a multicast mechanism, and the network side realizes retransmission based on the received NACK information. However, how to obtain or indicate the used resources feedback by the terminal, or how to make the network side effectively distinguish feedbacks from different terminals is a problem needing to be further solved.

SUMMARY

The purpose of the present disclosure is to provide a channel transmission method and apparatus, a network side device, and a terminal, so as to solve the problems in the related art that a feedback mechanism of a multicast mechanism easily causes the conflict of feedback resources used by terminals, and a network side cannot distinguish the transmitter of feedback information.

To solve the above problems, the embodiments of the present disclosure provide a channel transmission method, which is applied to a network side device, and may include the following operation.

PDCCH is transmitted to a first terminal. Cyclic Redundancy Check (CRC) of Downlink Control Information (DCI) of the PDCCH is scrambled by a first RNTI of the first terminal, and the scrambling sequence generator of PDSCH scheduled by the PDCCH is initialized with a second RNTI or a third parameter.

The second RNTI or the third parameter is different from the first RNTI, and the second RNTI or the third parameter is a common parameter of the first terminal and at least one other terminal.

The DCI indicates that the scrambling sequence generator of PDSCH scheduled by the PDCCH is initialized with a second RNTI or a third parameter.

A DCI format, of which the CRC is scrambled by the first RNTI, conveys a Physical Uplink Control Channel (PUCCH) resource indicator information field.

The method may further include the following operation.

The first RNTI is configured for the first terminal. Wherein different terminals have different first RNTIs.

The first RNTI of the first terminal is different from a C-RNTI assigned by a network side device for the first terminal.

The method may further include the following operation.

The same second RNTI or third parameter is configured for the first terminal and at least one other terminal, or the same second RNTI or third parameter is predefined for the first terminal and at least one other terminal through a protocol.

The method may further include the following operation.

A user equipment (UE) specific search space for transmitting the PDCCH is configured for the first terminal.

The operation that the PDCCH is transmitted to the first terminal may include the following operation.

The PDCCH is transmitted to the first terminal in the UE specific search space of the first terminal.

The DCI format of the UE specific search space of the first terminal is scrambled by the first RNTI of the first terminal; or, the DCI format of the UE specific search space of the first terminal is scrambled by the first RNTI of the first terminal and the C-RNTI of the first terminal.

The method may further include the following operation.

At least two sets of downlink configuration information are configured for the first terminal through high-layer signaling. The downlink configuration information includes: downlink Demodulation Reference Signal (DMRS) configuration information and/or PDSCH configuration information.

The at least two sets of downlink configuration information include:

downlink configuration information applicable to the PDSCH scheduled by the DCI, of which the CRC is scrambled by the first RNTI; and downlink configuration information applicable to the PDSCH scheduled by the DCI, of which the CRC is scrambled by an RNTI other than the first RNTI.

The initialization value of the scrambling sequence generator of the PDSCH scheduled by the DCI, of which the CRC is scrambled by the first RNTI, is related to a physical cell identifier.

The initialization value of a sequence generator of the DMRS of the PDSCH scheduled by the DCI, of which the CRC is scrambled by the first RNTI, is determined by the physical cell identifier.

The embodiments of the present disclosure also provide a channel transmission method, which is applied to a first terminal, and may include the following operation.

PDCCH is received. The CRC of the DCI of the PDCCH is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

The method may further include that: according to the indication of the DCI, the scrambling sequence generator of the PDSCH is initialized with the second RNTI or the third parameter.

The DCI format, of which the CRC is scrambled by the first RNTI, conveys the PUCCH resource indicator information field.

The method may further include the following operation.

HARQ feedback is performed to the received PDSCH on the corresponding PUCCH resource according to the value of the PUCCH resource indicator information field.

The method may further include the following operation.

The first RNTI configured by the network side device for the first terminal is obtained.

The first RNTI of the first terminal is different from the C-RNTI assigned by the network side device for the first terminal.

The method may further include the following operation.

The same second RNTI or third parameter configured by the network side device for the first terminal and at least one other terminal is obtained, or the second RNTI or third parameter shared by the first terminal and at least one other terminal is predefined according to a protocol.

The operation that the PDCCH is received may include the following operation.

The PDCCH is detected in the UE specific search space configured by the network side device for the first terminal.

The DCI format of the UE specific search space of the first terminal is scrambled by the first RNTI of the first terminal; or, the DCI format of the UE specific search space of the first terminal is scrambled by the first RNTI of the first terminal and the C-RNTI of the first terminal.

The method may further include the following operation.

At least two sets of downlink configuration information which are configured by the network side device for the first terminal through the high-layer signaling are obtained. The downlink configuration information includes: the downlink DMRS configuration information and/or the PDSCH configuration information.

The at least two sets of downlink configuration information include:

the downlink configuration information applicable to the PDSCH scheduled by the DCI, of which the CRC is scrambled by the first RNTI; and the downlink configuration information applicable to the PDSCH scheduled by the DCI, of which the CRC is scrambled by an RNTI other than the first RNTI.

The initialization value of the scrambling sequence generator of the PDSCH scheduled by the DCI, of which the CRC is scrambled by the first RNTI, is related to the physical cell identifier.

The initialization value of the sequence generator of the DMRS of the PDSCH scheduled by the DCI, of which the CRC is scrambled by the first RNTI, is determined by the physical cell identifier.

The embodiments of the present disclosure also provide a channel transmission apparatus, which is applied to a network side device, and may include: a transmitting module.

The transmitting module is configured to transmit the PDCCH to the first terminal. The CRC of the DCI of the PDCCH of the first terminal is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

The embodiments of the present disclosure also provide a network side device, which may include: a processor and a transceiver. The processor is configured to control the transceiver to perform the following process.

PDCCH is transmitted to the first terminal. The CRC of the DCI of the PDCCH of the first terminal is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

The embodiments of the present disclosure also provide a channel transmission apparatus, which is applied to a first terminal, and may include: a receiving module.

The receiving module is configured to receive the PDCCH. The CRC of the DCI of the PDCCH is scrambled by the first RNTI of the first terminal, and a scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

The embodiments of the present disclosure also provide a terminal, which is the first terminal, and may include: a processor and a transceiver. The processor is configured to control the transceiver to perform the following process.

PDCCH is received. The CRC of the DCI of the PDCCH is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

The embodiments of the present invention also provide a communication device, which may include: a memory, a processor and a computer program which is stored on the memory and capable of running on the processor. When executing the program, the processor implements the above channel transmission method.

The embodiments of the present disclosure also provide a computer-readable storage medium, in which a computer program may be stored. When executed by a processor, the program implements the steps in the above channel transmission method.

The above technical solution of the present disclosure at least has the following beneficial effects.

In the channel transmission method and apparatus, the network side device, and the terminal of the embodiments of the present disclosure, each of different terminals detect its own PDCCH independently, different PDCCHs schedule the same multicast or broadcast PDSCH resource, different PDCCHs indicate the PUCCH resource for HARQ feedback of each terminal separately, and each of different terminals perform HARQ feedback to the received multicast or broadcast PDSCH resource on its own PUCCH resource. In this way, individual HARQ feedback indication can be realized for each terminal, so as to avoid the conflict of feedback resources used by the terminals, and the network side can distinguish the transmitting terminals of the HARQ feedbacks according to the different PUCCH resources, so as to realize retransmission.

DETAILED DESCRIPTION

For making the technical problem to be solved, technical solutions and advantages of the present disclosure clearer, a detailed description is given below in combination with the accompanying drawings and the specific embodiments.

Figure 1:
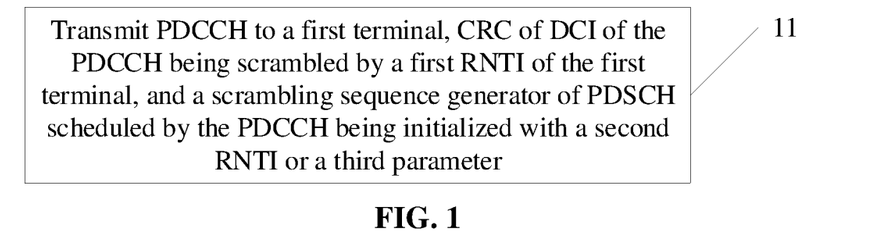
FIG. 1 illustrates a first schematic diagram of steps in a channel transmission method according to an embodiment of the present disclosure.

As shown in FIG. 1, the embodiments of the present disclosure provide a channel transmission method, which is applied to a network side device, and the method may include the following step.

At S11, PDCCH is transmitted to a first terminal. CRC of DCI of the PDCCH is scrambled by a first RNTI of the first terminal, and a scrambling sequence generator of PDSCH scheduled by the PDCCH is initialized with a second RNTI or a third parameter.

The second RNTI or the third parameter is different from the first RNTI, and the second RNTI or the third parameter is a common parameter of the first terminal and at least one other terminal.

In the embodiments of the present disclosure, because the CRC of the DCI of the PDCCH of the first terminal is scrambled by the first RNTI of the first terminal, each of different terminals may detect its own PDCCH independently according to its own first RNTI, each of different PDCCHs separately indicate the PUCCH resource for HARQ feedback of each terminal, and each of different terminals may perform HARQ feedback to the received PDSCH resource on its own PUCCH resource.

Optionally, because the second RNTI or the third parameter is the common parameter of the first terminal and at least one other terminal, the common PDSCH scheduled by the PDCCH of the first terminal and the PDCCH of at least one other terminal may realize the common detection of the same physical resource by multiple terminals, thereby realizing a multicast or broadcast function.

Optionally, because the second RNTI or the third parameter is different from the first RNTI, that is, the scrambling of the common PDSCH is unrelated to the first RNTI of the scheduling PDCCH, each terminal can use the PUCCH resource indicated by its own PDCCH to perform the HARQ feedback while the common detection of the same physical resource by multiple terminals is realized.

It is to be noted that the channel transmission method according to the embodiments of the present disclosure is a channel transmission method supporting multicast or broadcast, and the second RNTI or the third parameter is the common parameter of a terminal group (including the first terminal and at least one other terminal) of a multicast service.

Optionally, the channel transmission method according to the embodiments of the present disclosure is not limited to a specific service.

Optionally, a DCI format, of which the CRC is scrambled by the first RNTI, conveys a PUCCH resource indicator information field, and the PUCCH resource indicator information field may specifically be used for indicating the PUCCH resource for HARQ feedback of the terminal.

The DCI format of the PDCCH is DCI format 1_0 and/or DCI format 1_1.

As an optional embodiment, the method may further include the following operation.

The first RNTI is configured for the first terminal. Different terminals have different first RNTIs.

The first RNTI of the first terminal is different from a C-RNTI assigned by the network side device for the first terminal.

In the embodiments of the present disclosure, because different terminals have different first RNTIs, each of the different terminals may independently detect its own PDCCH according to its own first RNTI.

As another optional embodiment, the method may further include the following operation.

A same second RNTI or third parameter is configured for the first terminal and at least one other terminal, or the same second RNTI or third parameter is predefined for the first terminal and at least one other terminal through a protocol.

Optionally, the second RNTI or third parameter is different from the C-RNTI configured by the network side for the first terminal and at least one other terminal.

As another optional embodiment, the method may further include the following operation.

The first RNTI is the C-RNTI assigned for the first terminal.

A same second RNTI or third parameter is configured for the first terminal and at least one other terminal, or the same second RNTI or third parameter is predefined for the first terminal and at least one other terminal through a protocol.

The DCI, of which the CRC is scrambled by the first RNTI, namely the C-RNTI, indicates whether the scrambling sequence generator of the PDSCH scheduled currently is initialized with the second RNTI or the third parameter or initialized with the first RNTI.

In the embodiments of the present disclosure, because the C-RNTIs of different terminals are different, each of the different terminals may independently detect their PDCCH according to its own C-RNTI; meanwhile, the DCI indicates that the scrambling of the scheduled common PDSCH is unrelated to the first RNTI (C-RNTI) of the scheduling PDCCH, so each terminal can use the PUCCH resource indicated by its own PDCCH to perform the HARQ feedback while the common detection of the same physical resource by multiple terminals is realized.

As another optional embodiment, the method may further include the following operation.

A user equipment (UE) specific search space for transmitting the PDCCH is configured for the first terminal.

That operation of transmitting the PDCCH to the first terminal may include the following operation.

The PDCCH is transmitted to the first terminal in the UE specific search space of the first terminal.

The DCI format of the UE specific search space of the first terminal is scrambled by the first RNTI of the first terminal; or, the DCI format of the UE specific search space of the first terminal is scrambled by the first RNTI of the first terminal and the C-RNTI of the first terminal.

For example, the network side device configures a UE specific search space #1 for the first terminal through RRC signaling, and the DCI format of the UE specific search space #1 is scrambled by the first RNTI of the first terminal, so the first terminal only needs to perform one CRC scrambled by the first RNTI during blind check in the UE specific search space #1.

For another example, the network side device configures the UE specific search space #1 for the first terminal through RRC signaling, and the DCI format of the UE specific search space #1 is scrambled by the first RNTI of the first terminal and the C-RNTI of the first terminal, so the first terminal needs to perform two CRCs scrambled by the first RNTI and the C-RNTI during blind check in the UE specific search space #1.

As another optional embodiment, the method may further include the following operation.

At least two sets of downlink configuration information are configured for the first terminal through high-layer signaling. The downlink configuration information includes: downlink DMRS configuration information and/or PDSCH configuration information.

The at least two sets of downlink configuration information include:
  downlink configuration information applicable to the PDSCH scheduled by the DCI, of which the CRC is scrambled by the first RNTI, which may also be referred to as the downlink configuration information applicable to the multicast or broadcast service; and
  downlink configuration information applicable to the PDSCH scheduled by the DCI, of which the CRC is scrambled by an RNTI other than the first RNTI, which may also be referred to as the downlink configuration information applicable to the unicast service.

As another optional embodiment, the method may further include the following operation.

At least two sets of downlink configuration information are configured for the first terminal through the high-layer signaling. The downlink configuration information includes: the downlink DMRS configuration information and/or the PDSCH configuration information.

The at least two sets of downlink configuration information include:
  the downlink configuration information applicable to the multicast or broadcast service; and
  the downlink configuration information applicable to the unicast service.

The downlink configuration information used by the currently scheduled PDSCH is indicated in the DCI.

For example, the network side device configures two sets of downlink DMRS configuration information for the terminal through the high-layer signaling. The DMRS length in the first set of downlink DMRS configuration information is two symbols, an additional DMRS is configured, and the first set of downlink DMRS configuration information is applicable to the PDSCH scheduled by the DCI, of which the CRC is scrambled by the first RNTI. The DMRS length in the second set of downlink DMRS configuration information is one symbol, no additional DMRS is configured, and the second set of downlink DMRS configuration information is applicable to the PDSCH scheduled by the DCI, of which the CRC is scrambled by an RNTI (such as the C-RNTI) other than the first RNTI.

Optionally, the initialization value of the scrambling sequence generator of the PDSCH scheduled by the DCI, of which the CRC is scrambled by the first RNTI, is related to a physical cell identifier.

For example, the initialization value $c_{init}$ of the scrambling sequence generator of the PDSCH scheduled by the DCI, of which the CRC is scrambled by the first RNTI, is:

$$c_{init} = n_{RNTI} \cdot 2^{15} + q \cdot 2^{14} + n_{ID}$$

where, $n_{RNTI}$ is the second RNTI or the third parameter, and $n_{ID} = N_{ID}^{cell}$ is the physical cell identifier.

Optionally, the initialization value of a sequence generator of the DMRS of the PDSCH scheduled by the DCI, of which the CRC is scrambled by the first RNTI, is determined by the physical cell identifier.

For example, the initialization value of the scrambling sequence generator of the DMRS of the PDSCH scheduled by the DCI, of which the CRC is scrambled by the first RNTI, is:

$$c_{init} = (2^{17}(N_{symb}^{slot} n_{s,f}^{\mu} + l + 1)(2N_{ID}^{nSCID}) + 2N_{ID}^{nSCID} + n_{SCID}) \bmod 2^{31}$$

where, $N_{ID}^{nSCID} = N_{ID}^{cell}$ is the physical cell identifier, $N_{symb}^{slot}$ is the number of symbols in a time slot, and $n_{s,f}^{\mu}$ is a time slot index in the next radio frame with a subcarrier spacing configured as $\mu$.

To sum up, in the embodiments of the present disclosure, each of different terminals independently detect its own PDCCH, different PDCCHs schedule the same multicast or broadcast PDSCH resource, different PDCCHs separately indicate the PUCCH resource for HARQ feedback of each terminal, and each of different terminals perform HARQ feedback to the received multicast or broadcast PDSCH resource on its own PUCCH resource. In this way, individual HARQ feedback indication can be realized for each terminal, so as to avoid the conflict of feedback resources used by the terminals, and the network side can distinguish the transmitting terminals of the HARQ feedbacks according to the different PUCCH resources, so as to realize retransmission.

Figure 2:
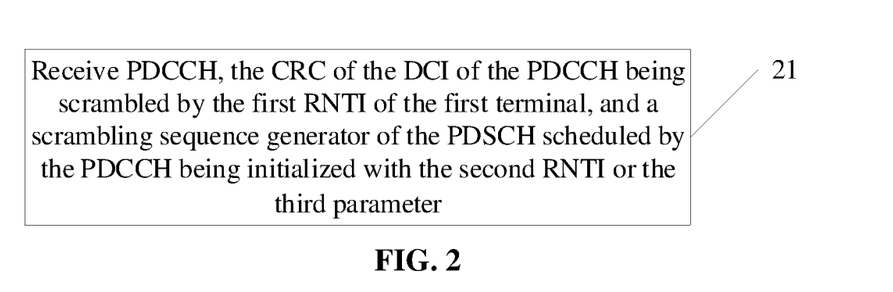
FIG. 2 illustrates a second schematic diagram of steps in a channel transmission method according to an embodiment of the present disclosure.

As shown in FIG. 2, the embodiments of the present disclosure also provide a channel transmission method, which is applied to a first terminal, and may include the following step.

At S21, PDCCH is received. The CRC of the DCI of the PDCCH is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

In the embodiments of the present disclosure, because the CRC of the DCI of the PDCCH of the first terminal is scrambled by the first RNTI of the first terminal, each of different terminals may independently detect its own PDCCH according to its own first RNTI, different PDCCHs separately indicate the PUCCH resource for HARQ feedback of each terminal, and each of different terminals may perform HARQ feedback to the received PDSCH resource on its own PUCCH resource.

Optionally, because the second RNTI or the third parameter is the common parameter of the first terminal and at least one other terminal, the common PDSCH scheduled by the PDCCH of the first terminal and the PDCCH of at least one other terminal may realize the common detection of the same physical resource by multiple terminals, thereby realizing a multicast or broadcast function.

Optionally, because the second RNTI or the third parameter is different from the first RNTI, that is, the scrambling of the common PDSCH is unrelated to the first RNTI of the scheduling PDCCH, each terminal can use the PUCCH resource indicated by its own PDCCH to perform the HARQ feedback while the common detection of the same physical resource by multiple terminals is realized.

It is to be noted that the channel transmission method according to the embodiments of the present disclosure is a channel transmission method supporting multicast or broadcast, and the second RNTI or the third parameter is the common parameter of a terminal group (including the first terminal and at least one other terminal) of a multicast service.

Optionally, the DCI format, of which the CRC is scrambled by the first RNTI, conveys the PUCCH resource indicator information field, and the PUCCH resource indicator information field may specifically be used for indicating the PUCCH resource for HARQ feedback of the terminal.

The method may further include the following operation.

HARQ feedback is performed to the received PDSCH on the PUCCH resource corresponding to the value of the PUCCH resource indicator information field.

The DCI format of the PDCCH is the DCI format 1_0 and/or the DCI format 1_1.

As an optional embodiment, the method may further include the following operation.

The first RNTI configured by the network side device for the first terminal is obtained. Different terminals have different first RNTIs.

The first RNTI of the first terminal is different from the C-RNTI assigned by the network side device for the first terminal.

In the embodiments of the present disclosure, because different terminals have different first RNTIs, each of the different terminals may independently detect its own PDCCH according to its own first RNTI.

As another optional embodiment, the method may further include the following operation.

The same second RNTI or third parameter configured by the network side device for the first terminal and at least one other terminal is obtained, or the second RNTI or third parameter shared by the first terminal and at least one other terminal is predefined according to a protocol.

Optionally, the second RNTI or third parameter is different from the C-RNTI configured by the network side device for the first terminal and at least one other terminal.

As another optional embodiment, S21 may include the following operation.

The PDCCH is detected in the UE specific search space configured by the network side device for the first terminal.

The DCI format of the UE specific search space of the first terminal is scrambled by the first RNTI of the first terminal; or, the DCI format of the UE specific search space of the first terminal is scrambled by the first RNTI of the first terminal and the C-RNTI of the first terminal.

For example, the network side device configures the UE specific search space #1 for the first terminal through the RRC signaling, and the DCI format of the UE specific search space #1 is scrambled by the first RNTI of the first terminal, so the first terminal only needs to perform one CRC scrambled by the first RNTI during blind check in the UE specific search space #1.

For another example, the network side device configures the UE specific search space #1 for the first terminal through RRC signaling, and the DCI format of the UE specific search space #1 is scrambled by the first RNTI of the first terminal or the C-RNTI of the first terminal, so the first terminal needs to perform two CRCs scrambled by the first RNTI and the C-RNTI during blind check in the UE specific search space #1.

As another optional embodiment, the method may further include the following operation.

At least two sets of downlink configuration information which are configured by the network side device for the first terminal through the high-layer signaling are obtained. The downlink configuration information includes: the downlink DMRS configuration information and/or the PDSCH configuration information.

The at least two sets of downlink configuration information include:

the downlink configuration information applicable to the PDSCH scheduled by the DCI, of which the CRC is scrambled by the first RNTI, which may also be referred to as the downlink configuration information applicable to the multicast or broadcast service; and the downlink configuration information applicable to the PDSCH scheduled by the DCI, of which the CRC is scrambled by an RNTI other than the first RNTI, which may also be referred to as the downlink configuration information applicable to the unicast service.

For example, the network side device configures two sets of downlink DMRS configuration information for the terminal through the high-layer signaling. The DMRS length in the first set of downlink DMRS configuration information is two symbols, an additional DMRS is configured, and the first set of downlink DMRS configuration information is applicable to the PDSCH scheduled by the PDCCH, of which the CRC is scrambled by the first RNTI. The DMRS length in the second set of downlink DMRS configuration information is one symbol, no additional DMRS is configured, and the second set of downlink DMRS configuration information is applicable to the PDSCH scheduled by the PDCCH, of which the CRC is scrambled by an RNTI (such as the C-RNTI) other than the first RNTI.

Optionally, the initialization value of the scrambling sequence generator of the PDSCH scheduled by the DCI, of which the CRC is scrambled by the first RNTI, is related to a physical cell identifier.

For example, the initialization value $c_{init}$ of the scrambling sequence generator of the PDSCH scheduled by the DCI, of which the CRC is scrambled by the first RNTI, is:

$$c_{init} = n_{RNTI} \cdot 2^{15} + q \cdot 2^{14} + n_{ID}$$

where, $n_{RNTI}$ is the second RNTI or the third parameter, and $n_{ID} = N_{ID}^{cell}$ is the physical cell identifier.

Optionally, the initialization value of the sequence generator of the DMRS of the PDSCH scheduled by the PDCCH, of which the CRC is scrambled by the first RNTI, is determined by the physical cell identifier.

For example, the initialization value of the scrambling sequence generator of the DMRS of the PDSCH scheduled by the PDCCH, of which the CRC is scrambled by the first RNTI, is:

$$c_{init} = (2^{17}(N_{symb}^{slot} n_{s,f}^{\mu} + l + 1)(2N_{ID}^{nSCID}) + 2N_{ID}^{nSCID} + n_{SCID}) \bmod 2^{31}$$

where, $N_{ID}^{nSCID} = N_{ID}^{cell}$ is the physical cell identifier, $N_{symb}^{slot}$ is the number of symbols in a time slot, and $n_{s,f}^{\mu}$ is a time slot index in the next radio frame with a subcarrier spacing configured as $\mu$.

To sum up, in the embodiments of the present disclosure, each of different terminals independently detects its own PDCCH, different PDCCHs schedule the same multicast or broadcast PDSCH resource, different PDCCHs separately indicate the PUCCH resource for HARQ feedback of each terminal, and each of different terminals perform HARQ feedback to the received multicast or broadcast PDSCH resource on its own PUCCH resource. In this way, individual HARQ feedback indication can be realized for each terminal, so as to avoid the conflict of feedback resources used by the terminals, and the network side can distinguish the transmitting terminals of the HARQ feedbacks according to the different PUCCH resources, so as to realize retransmission.

Figure 3:
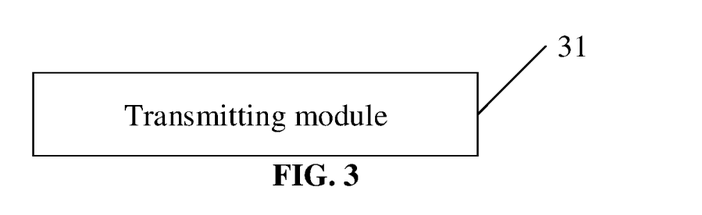
FIG. 3 illustrates a first structural schematic diagram of a channel transmission apparatus according to an embodiment of the present disclosure.

As shown in FIG. 3, the embodiments of the present disclosure also provide a channel transmission apparatus, which is applied to a network side device, and may include: a transmitting module 31.

The transmitting module 31 is configured to transmit the PDCCH to the first terminal. The CRC of the DCI of the PDCCH of the first terminal is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

Optionally, in the above embodiments of the present disclosure, the DCI format, of which the CRC is scrambled by the first RNTI, conveys the PUCCH resource indicator information field.

Optionally, in the above embodiments of the present disclosure, the apparatus may further include a first configuring module.

The first configuring module is configured to configure the first RNTI for the first terminal. Different terminals have different first RNTIs.

The first RNTI of the first terminal is different from the C-RNTI assigned by the network side device for the first terminal.

Optionally, in the above embodiments of the present disclosure, the apparatus may further include a second configuring module.

The second configuring module is configured to configure the same second RNTI or third parameter for the first terminal and at least one other terminal, or predefine the same second RNTI or third parameter for the first terminal and at least one other terminal through a protocol.

Optionally, in the above embodiments of the present disclosure, the apparatus may further include a third configuring module.

The third configuring module is configured to configure for the first terminal the UE specific search space for transmitting the PDCCH.

The transmitting module includes a transmitting submodule.

The transmitting submodule is configured to transmit the PDCCH to the first terminal in the UE specific search space of the first terminal.

Optionally, in the above embodiments of the present disclosure, the DCI format of the UE specific search space of the first terminal is scrambled by the first RNTI of the first terminal;

or, the DCI format of the UE specific search space of the first terminal is scrambled by the first RNTI of the first terminal and the C-RNTI of the first terminal.

Optionally, in the above embodiments of the present disclosure, the apparatus may further include a fourth configuring module.

The fourth configuring module is configured to configure at least two sets of downlink configuration information for the first terminal through the high-layer signaling. The downlink configuration information includes: the downlink DMRS configuration information and/or the PDSCH configuration information.

The at least two sets of downlink configuration information include:
the downlink configuration information applicable to the PDSCH scheduled by the DCI, of which the CRC is scrambled by the first RNTI; and
the downlink configuration information applicable to the PDSCH scheduled by the DCI, of which the CRC is scrambled by an RNTI other than the first RNTI.

Optionally, in the above embodiments of the present disclosure, the initialization value of the scrambling sequence generator of the PDSCH scheduled by the DCI, of which the CRC is scrambled by the first RNTI, is related to the physical cell identifier.

Optionally, in the above embodiments of the present disclosure, the initialization value of the sequence generator of the DMRS of the PDSCH scheduled by the DCI, of which the CRC is scrambled by the first RNTI, is determined by the physical cell identifier.

To sum up, in the embodiments of the present disclosure, each of different terminals independently detect its own PDCCH, different PDCCHs schedule the same multicast or broadcast PDSCH resource, different PDCCHs separately indicate the PUCCH resource for HARQ feedback of each terminal, and each of different terminals perform HARQ feedback to the received multicast or broadcast PDSCH resource on its own PUCCH resource. In this way, individual HARQ feedback indication can be realize for each terminal, so as to avoid the conflict of feedback resources used by the terminals, and the network side can distinguish the transmitting terminal of the HARQ feedback according to the different PUCCH resources, so as to realize retransmission.

It is to be noted that the channel transmission apparatus according to the embodiments of the present disclosure is an apparatus that can perform the channel transmission method, so all embodiments of the channel transmission method are applied to the apparatus and can achieve the same or similar beneficial effects.

Figure 4:
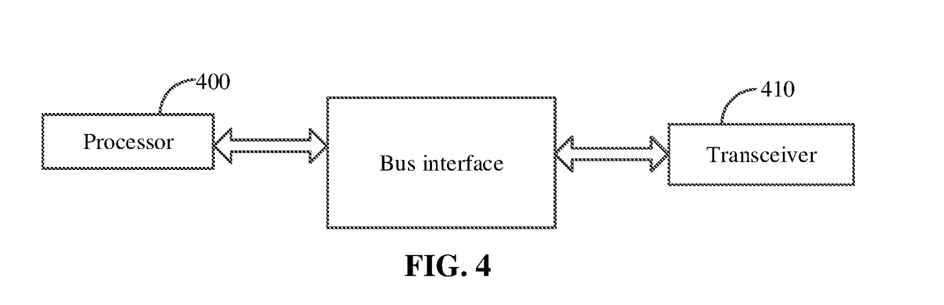
FIG. 4 illustrates a structural schematic diagram of a network side device according to an embodiment of the present disclosure.

As shown in FIG. 4, the embodiments of the present disclosure further provide a network side device, which may include: a processor 400 and a transceiver 410. The processor 400 is configured to control the transceiver 410 to perform the following process.

PDCCH is transmitted to the first terminal. The CRC of the DCI of the PDCCH is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

Optionally, in the above embodiments of the present disclosure, the DCI format, of which the CRC is scrambled by the first RNTI, conveys the PUCCH resource indicator information field.

Optionally, in the above embodiments of the present disclosure, the processor 400 is further configured to:
configure the first RNTI for the first terminal. Different terminals have different first RNTIs.

The first RNTI of the first terminal is different from the C-RNTI assigned by the network side device for the first terminal.

Optionally, in the above embodiments of the present disclosure, the processor 400 is further configured to:
configure the same second RNTI or third parameter for the first terminal and at least one other terminal, or predefine the same second RNTI or third parameter for the first terminal and at least one other terminal through a protocol.

Optionally, in the above embodiments of the present disclosure, the processor 400 is further configured to:
configure for the first terminal the UE specific search space for transmitting the PDCCH.

The transceiver 410 is further configured to:
transmit the PDCCH to the first terminal in the UE specific search space of the first terminal.

Optionally, in the above embodiments of the present disclosure, the DCI format of the UE specific search space of the first terminal is scrambled by the first RNTI of the first terminal;
or,
the DCI format of the UE specific search space of the first terminal is scrambled by the first RNTI of the first terminal and the C-RNTI of the first terminal.

Optionally, in the above embodiments of the present disclosure, the processor 400 is further configured to:
configure at least two sets of downlink configuration information for the first terminal through the high-layer signaling. The downlink configuration information includes: the downlink DMRS configuration information and/or the PDSCH configuration information.

The at least two sets of downlink configuration information include:
the downlink configuration information applicable to the PDSCH scheduled by the DCI, of which the CRC is scrambled by the first RNTI; and
the downlink configuration information applicable to the PDSCH scheduled by the DCI, of which the CRC is scrambled by an RNTI other than the first RNTI.

Optionally, in the above embodiments of the present disclosure, the initialization value of the scrambling sequence generator of the PDSCH scheduled by the DCI, of which the CRC is scrambled by the first RNTI, is related to the physical cell identifier.

Optionally, in the above embodiments of the present disclosure, the initialization value of the sequence generator of the DMRS of the PDSCH scheduled by the DCI, of which the CRC is scrambled by the first RNTI, is determined by the physical cell identifier.

To sum up, in the embodiments of the present disclosure, each of different terminals independently detect its own PDCCH, different PDCCHs schedule the same multicast or broadcast PDSCH resource, different PDCCHs separately indicate the PUCCH resource for HARQ feedback of each terminal, and each of different terminals perform HARQ feedback to the received multicast or broadcast PDSCH resource on its own PUCCH resource. In this way, individual HARQ feedback indication can be realized for each terminal, so as to avoid the conflict of feedback resources used by the terminals, and the network side can distinguish the transmitting terminal of the HARQ feedback according to the different PUCCH resources, so as to realize retransmission.

It is to be noted that the network side device according to the embodiments of the present disclosure is a network side device that can perform the channel transmission method, so all embodiments of the channel transmission method are applied to the network side device and can achieve the same or similar beneficial effects.

The embodiments of the present disclosure also provide a communication device, which is a network side device, and may include: a memory, a processor and a computer program stored in the memory and capable of running on the processor. When executing the program, the processor implements each process in the above embodiments of the channel transmission method and can achieve the same technical effects. For avoiding repetitions, elaborations are omitted herein.

The embodiments of the present disclosure also provide a computer readable storage medium, in which a computer program is stored. When executed by the processor, the program implements each process in the above embodiments of the channel transmission method and can achieve the same technical effects. For avoiding repetitions, elaborations are omitted herein. The computer-readable storage medium is a Read-Only Memory (ROM), a Random Access Memory (RAM), a magnetic disk or an optical disc, etc.

Figure 5:
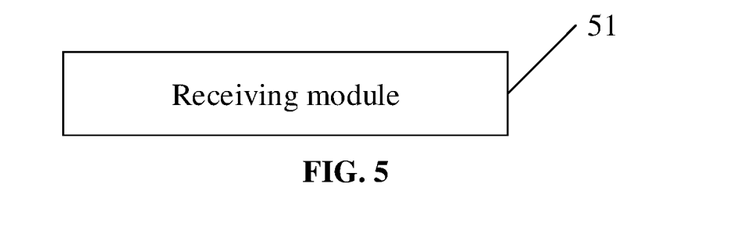
FIG. 5 illustrates a second structural schematic diagram of a channel transmission apparatus according to an embodiment of the present disclosure.

As shown in FIG. 5, the embodiments of the present disclosure also provide a channel transmission apparatus, which is applied to a first terminal, and may include: a receiving module 51.

The receiving module 51 is configured to receive the PDCCH. The CRC of the DCI of the PDCCH is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

Optionally, in the above embodiments of the present disclosure, the DCI format, of which the CRC is scrambled by the first RNTI, conveys the PUCCH resource indicator information field.

The apparatus may also include: a feedback module.

The feedback module is configured to perform HARQ feedback to the received PDSCH on the PUCCH resource corresponding to the value of the PUCCH resource indicator information field.

Optionally, in the above embodiments of the present disclosure, the apparatus may also include: a first obtaining module.

The first obtaining module is configured to obtain the first RNTI configured by the network side device for the first terminal. Different terminals have different first RNTIs.

The first RNTI of the first terminal is different from the C-RNTI assigned by the network side device for the first terminal.

Optionally, in the above embodiments of the present disclosure, the apparatus may further include: a second obtaining module.

The second obtaining module is configured to obtain the same second RNTI or third parameter configured by the network side device for the first terminal and at least one other terminal, or predefine the second RNTI or third parameter shared by the first terminal and at least one other terminal according to a protocol.

Optionally, in the above embodiments of the present disclosure, the receiving module may include: a receiving submodule.

The receiving submodule is configured to detect the PDCCH in the UE specific search space configured by the network side device for the first terminal.

Optionally, in the above embodiments of the present disclosure, the DCI format of the UE specific search space of the first terminal is scrambled by the first RNTI of the first terminal;

or, the DCI format of the UE specific search space of the first terminal is scrambled by the first RNTI of the first terminal and the C-RNTI of the first terminal.

Optionally, in the above embodiments of the present disclosure, the apparatus may further include a third obtaining module.

The third obtaining module is configured to obtain at least two sets of downlink configuration information which are configured for the first terminal by the network side device through the high-layer signaling. The downlink configuration information includes: the downlink DMRS configuration information and/or the PDSCH configuration information.

The at least two sets of downlink configuration information include:

the downlink configuration information applicable to the PDSCH scheduled by the DCI, of which the CRC is scrambled by the first RNTI; and the downlink configuration information applicable to the PDSCH scheduled by the DCI, of which the CRC is scrambled by an RNTI other than the first RNTI.

Optionally, in the above embodiments of the present disclosure, the initialization value of the scrambling sequence generator of the PDSCH scheduled by the DCI, of which the CRC is scrambled by the first RNTI, is related to the physical cell identifier.

Optionally, in the above embodiments of the present disclosure, the initialization value of the sequence generator of the DMRS of the PDSCH scheduled by the DCI, of which the CRC is scrambled by the first RNTI, is determined by the physical cell identifier.

To sum up, in the embodiments of the present disclosure, each of different terminals independently detect its own PDCCH, different PDCCHs schedule the same multicast or broadcast PDSCH resource, different PDCCHs separately indicate the PUCCH resource for HARQ feedback of each terminal, and each of different terminals perform HARQ feedback to the received multicast or broadcast PDSCH resource on its own PUCCH resource. In this way, individual HARQ feedback indication can be realized for each terminal, so as to avoid the conflict of feedback resources used by the terminals, and the network side can distinguish the transmitting terminals of the HARQ feedbacks according to the different PUCCH resources, so as to realize retransmission.

It is to be noted that the channel transmission apparatus according to the embodiments of the present disclosure is an apparatus that can perform the channel transmission method, so all embodiments of the channel transmission method are applied to the apparatus and can achieve the same or similar beneficial effects.

Figure 6:
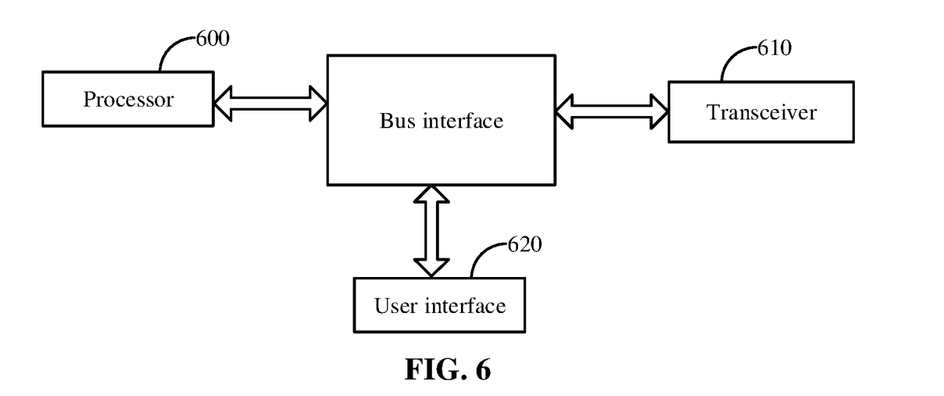
FIG. 6 illustrates a structural schematic diagram of a terminal according to an embodiment of the present disclosure.

As shown in FIG. 6, the embodiments of the present disclosure further provide a terminal, which is the first terminal, and may include: a processor 600 and a transceiver 610. The terminal may further include a user interface 620. The processor 600 is configured to control the transceiver 610 to perform the following process.

PDCCH is received. The CRC of the DCI of the PDCCH is scrambled by the first RNTI of the first terminal, and the scrambling sequence generator of the PDSCH scheduled by the PDCCH is initialized with the second RNTI or the third parameter.

The second RNTI or the third parameter is different from the first RNTI, and the second RNTI or the third parameter is the common parameter of the first terminal and at least one other terminal.

Optionally, in the above embodiments of the present disclosure, the DCI format, of which the CRC is scrambled by the first RNTI, conveys the PUCCH resource indicator information field.

The transceiver 610 is further configured to:
perform HARQ feedback to the received PDSCH on the PUCCH resource corresponding to the value of the PUCCH resource indicator information field.

Optionally, in the above embodiments of the present disclosure, the transceiver 610 is further configured to:
obtain the first RNTI configured by the network side device for the first terminal. Different terminals have different first RNTIs.

The first RNTI of the first terminal is different from the C-RNTI assigned by the network side device for the first terminal.

Optionally, in the above embodiments of the present disclosure, the transceiver 610 is further configured to:
obtain the same second RNTI or third parameter configured by the network side device for the first terminal and at least one other terminal, or predefine the second RNTI or third parameter shared by the first terminal and at least one other terminal according to a protocol.

Optionally, in the above embodiments of the present disclosure, the transceiver 610 is further configured to:
detect the PDCCH in the UE specific search space configured by the network side device for the first terminal.

Optionally, in the above embodiments of the present disclosure, the DCI format of the UE specific search space of the first terminal is scrambled by the first RNTI of the first terminal;
or,
the DCI format of the UE specific search space of the first terminal is scrambled by the first RNTI of the first terminal and the C-RNTI of the first terminal.

Optionally, in the above embodiments of the present disclosure, the transceiver 610 is further configured to:
obtain at least two sets of downlink configuration information which are configured by the network side device for the first terminal through the high-layer signaling. The downlink configuration information includes: the downlink DMRS configuration information and/or the PDSCH configuration information.

The at least two sets of downlink configuration information include:
the downlink configuration information applicable to the PDSCH scheduled by the DCI, of which the CRC is scrambled by the first RNTI; and
the downlink configuration information applicable to the PDSCH scheduled by the DCI, of which the CRC is scrambled by an RNTI other than the first RNTI.

Optionally, in the above embodiments of the present disclosure, the initialization value of the scrambling sequence generator of the PDSCH scheduled by the DCI, of which the CRC is scrambled by the first RNTI, is related to the physical cell identifier.

Optionally, in the above embodiments of the present disclosure, the initialization value of the sequence generator of the DMRS of the PDSCH scheduled by the DCI, of which the CRC is scrambled by the first RNTI, is determined by the physical cell identifier.

To sum up, in the embodiments of the present disclosure, each of different terminals independently detect its own PDCCH, different PDCCHs schedule the same multicast or broadcast PDSCH resource, different PDCCHs separately indicate the PUCCH resource for HARQ feedback of each terminal, and each of different terminals perform HARQ feedback to the received multicast or broadcast PDSCH resource on its own PUCCH resource. In this way, individual HARQ feedback indication can be realized for each terminal, so as to avoid the conflict of feedback resources used by the terminals, and the network side can distinguish the transmitting terminals of the HARQ feedbacks according to the different PUCCH resources, so as to realize retransmission.

It is to be noted that the terminal provided by the embodiments of the present disclosure is a terminal that can perform the channel transmission method, so all embodiments of the channel transmission method are applied to the terminal and can achieve the same or similar beneficial effects.

The embodiments of the present disclosure further provide a communication device, which is the first terminal, and may include: a memory, a processor and a computer program stored in the memory and capable of running on the processor. When executing the program, the processor implements each process in the above embodiments of the channel transmission method and can achieve the same technical effects. For avoiding repetitions, elaborations are omitted herein.

The embodiments of the present disclosure also provide a computer readable storage medium, in which a computer program is stored. When executed by the processor, the program implements each process in the above embodiments of the channel transmission method and can achieve the same technical effects. For avoiding repetitions, elaborations are omitted herein. The computer-readable storage medium is a Read-Only Memory (ROM), a Random Access Memory (RAM), a magnetic disk or an optical disc, etc.

Those skilled in the art should understand that the embodiments of the present application may be provided as a method, a system or a computer program product Thus, the present application may adopt forms of complete hardware embodiments, complete software embodiments or embodiments integrating software and hardware. Moreover, the present application may adopt the form of a computer program product implemented on one or more computer readable storage media (including, but not limited to, a disk memory and an optical memory) containing computer available program codes.

The present application is described with reference to flowcharts and/or block diagrams of the method, the device (system) and the computer program product according to the embodiments of the present application. It is to be understood that each flow and/or block in the flowcharts and/or the block diagrams and combinations of the flows and/or blocks in the flowcharts and/or the block diagrams may be implemented by computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable storage medium which can guide the computer or other programmable data processing devices to work in a particular way, so that the instructions stored in the computer-readable storage medium generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In the embodiments provided by the present application, it is to be understood that the disclosed device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The storage media include: various media capable of storing program codes such as a USB flash disk, a mobile hard disk, a ROM, a RAM, a magnetic disk or a compact disc.

Those ordinary skilled in the art may understand that all or a part of flows of the method in the above embodiments may be completed by related hardware controlled by a computer program. The program may be stored in a computer readable storage medium. When executed, the computer program may include the flows in the embodiments of the method. The storage medium may be a magnetic disk, a compact disc, a ROM, or a RAM.

It is understandable that these embodiments of the disclosure described here may be implemented by hardware, software, firmware, middleware, microcode, or a combination thereof. For hardware implementation, modules, units, subunits and so on may be realized in one or more of Application Specific Integrated Circuits (ASIC), Digital Signal Processors (DSP), DSP Devices (DSPD), Programmable Logic Devices (PLD), Field-Programmable Gate Arrays (FPGA), universal processors, controllers, microcontrollers, microprocessors, other electronic units for implementing the functions of the disclosure or a combination thereof.

For software implementation, the technology described in the embodiments of the present disclosure can be implemented through modules (such as procedures and functions) that perform the functions described in the embodiments of the disclosure. A software code can be stored in the memory and executed by the processor. The memory can be implemented in or outside the processor.

The above is only the optional embodiments of the disclosure; it should be indicated that, on the premise of not departing from the principles of the disclosure, those of ordinary skill in the art may also make a number of improvements and supplements, and these improvements and supplements should fall within the protection scope of the disclosure.

The invention claimed is:

1. A channel transmission method, applicable to at least one of multicast or broadcast of a Physical Downlink Shared Channel (PDSCH) and performed by a network side device, the channel transmission method comprising:
   transmitting a first Physical Downlink Control Channel (PDCCH) to a first terminal, and transmitting a second PDCCH to a second terminal,
   wherein a first Cyclic Redundancy Check (CRC) of first Downlink Control Information (DCI) of the first PDCCH is scrambled by a first Radio Network Temporary Identifier (RNTI) of the first terminal, and a scrambling sequence generator of the PDSCH, scheduled by the first PDCCH and the second PDCCH, is initialized with a second RNTI or a third parameter different from the first RNTI.

2. The channel transmission method of claim 1, wherein the first DCI indicates that the scrambling sequence generator of PDSCH scheduled by the first PDCCH and the second PDCCH, is initialized with the second RNTI or the third parameter.

3. The channel transmission method of claim 1, wherein a DCI format, of which the first CRC is scrambled by the first RNTI, conveys a Physical Uplink Control Channel (PUCCH) resource indicator information field.

4. The channel transmission method according to claim 1, further comprising:
configuring the first RNTI for the first terminal, wherein different terminals have different first RNTIs.

5. The channel transmission method according to claim 4, wherein the first RNTI of the first terminal is different from a Cell RNTI (C-RNTI) assigned by the network side device for the first terminal.

6. The channel transmission method according to claim 1, further comprising:
configuring a same second RNTI or a same third parameter for the first terminal and at least one other terminal, or
predefining the same second RNTI or the same third parameter for the first terminal and the at least one other terminal through a protocol.

7. The channel transmission method according to claim 1, further comprising:
configuring for the first terminal a user equipment (UE) specific search space for transmitting the first PDCCH; and
wherein transmitting the first PDCCH to the first terminal comprises:
transmitting the first PDCCH to the first terminal in the UE specific search space of the first terminal; and
wherein a DCI format of the UE specific search space of the first terminal is scrambled by the first RNTI of the first terminal, or the DCI format of the UE specific search space of the first terminal is scrambled by the first RNTI of the first terminal and a Cell RNTI (C-RNTI) of the first terminal.

8. The channel transmission method according to claim 1, further comprising:
configuring at least two sets of downlink configuration information for the first terminal through high-layer signaling, wherein the at least two sets of downlink configuration information comprises at least one of: downlink Demodulation Reference Signal (DMRS) configuration information or PDSCH configuration information;
wherein the at least two sets of downlink configuration information comprise:
downlink configuration information applicable to the PDSCH scheduled by the first DCI, of which the first CRC is scrambled by the first RNTI; and
downlink configuration information applicable to the PDSCH scheduled by the first DCI, of which the first CRC is scrambled by a third RNTI other than the first RNTI.

9. The channel transmission method according to claim 1, wherein an initialization value of the scrambling sequence generator of the PDSCH scheduled by the first DCI, of which the first CRC is scrambled by the first RNTI, is related to a physical cell identifier; or
wherein an initialization value of a sequence generator of a Demodulation Reference Signal (DMRS) of the PDSCH scheduled by the first DCI, of which the first CRC is scrambled by the first RNTI, is determined by the physical cell identifier.

10. A channel transmission method, applicable to at least one of multicast or broadcast of a Physical Downlink Shared Channel (PDSCH) and performed by a first terminal, the channel transmission method comprising:
receiving a first Physical Downlink Control Channel (PDCCH),
wherein a first Cyclic Redundancy Check (CRC) of first Downlink Control Information (DCI) of the first PDCCH is scrambled by a first Radio Network Temporary Identifier (RNTI) of the first terminal, and a scrambling sequence generator of the PDSCH scheduled by the first PDCCH and a second PDCCH received by a second terminal, is initialized with a second RNTI or a third parameter different from the first RNTI.

11. The channel transmission method of claim 10, further comprising: initializing, according to an indication of the first DCI, the scrambling sequence generator of the PDSCH with the second RNTI or the third parameter.

12. The channel transmission method of claim 10, wherein a DCI format, of which the first CRC is scrambled by the first RNTI, conveys a Physical Uplink Control Channel (PUCCH) resource indicator information field; and
wherein the method further comprises:
performing Hybrid Automatic Repeat reQuest (HARQ) feedback to the received PDSCH on a PUCCH resource corresponding to a value of the PUCCH resource indicator information field.

13. The channel transmission method according to claim 10, further comprising:
obtaining the first RNTI configured by a network side device for the first terminal, wherein different terminals have different first RNTIs.

14. The channel transmission method according to claim 13, wherein the first RNTI of the first terminal is different from a Cell RNTI (C-RNTI) assigned by the network side device for the first terminal.

15. The channel transmission method according to claim 10, further comprising:
obtaining a same second RNTI or a same third parameter configured by a network side device for the first terminal and at least one other terminal, or
predefining the second RNTI or the third parameter shared by the first terminal and the at least one other terminal according to a protocol.

16. The channel transmission method of claim 10, wherein receiving the first PDCCH comprises:
detecting the first PDCCH in a user equipment (UE) specific search space configured by a network side device for the first terminal; and
wherein a DCI format of the UE specific search space of the first terminal is scrambled by the first RNTI of the first terminal, or the DCI format of the UE specific search space of the first terminal is scrambled by the first RNTI of the first terminal and a Cell RNTI (C-RNTI) of the first terminal.

17. The channel transmission method according to claim 10, further comprising:
obtaining at least two sets of downlink configuration information which are configured by a network side device for the first terminal through high-layer signaling, wherein the at least two sets of downlink configuration information comprises at least one of: downlink Demodulation Reference Signal (DMRS) configuration information, or PDSCH configuration information;

wherein the at least two sets of downlink configuration information comprise:

downlink configuration information applicable to the PDSCH scheduled by the first DCI, of which the first CRC is scrambled by the first RNTI; and downlink configuration information applicable to the PDSCH scheduled by the first DCI, of which the first CRC is scrambled by a third RNTI other than the first RNTI.

18. The channel transmission method according to claim 10, wherein an initialization value of the scrambling sequence generator of the PDSCH scheduled by the first DCI, of which the first CRC is scrambled by the first RNTI, is related to a physical cell identifier; or wherein an initialization value of a sequence generator of a Demodulation Reference Signal (DMRS) of the PDSCH scheduled by the first DCI, of which the first CRC is scrambled by the first RNTI, is determined by the physical cell identifier.

19. A terminal, which is a first terminal, comprising: a processor and a transceiver, wherein the processor is configured to control the transceiver to perform the method of claim 10.

20. A network side device applicable to at least one of multicast or broadcast of a Physical Downlink Shared Channel (PDSCH), comprising: a processor and a transceiver, wherein the processor is configured to control the transceiver to perform a following process:

transmitting a first Physical Downlink Control Channel (PDCCH) to a first terminal, and transmitting a second PDCCH to a second terminal, wherein a first Cyclic Redundancy Check (CRC) of first Downlink Control Information (DCI) of the first PDCCH is scrambled by a first Radio Network Temporary Identifier (RNTI) of the first terminal, and a scrambling sequence generator of the PDSCH scheduled by the first PDCCH and the second PDCCH, is initialized with a second RNTI or a third parameter different from the first RNTI.

* * * * *